United States Patent [19]
Jozefonvicz née Dorgebray et al.

[11] Patent Number: 5,372,820
[45] Date of Patent: Dec. 13, 1994

[54] MATERIALS CAPABLE OF BINDING BIOLOGICAL SUBSTANCES, AND ITS APPLICATIONS, IN PARTICULAR, AS IN AN AFFINITY CHROMATOGRAPHY SUPPORT

[75] Inventors: Jacqueline Jozefonvicz née Dorgebray, Lamorlaye; Xavier-François Santarelli, Orleans; Daniel A. Muller, Soisy-sous-Montmorency, all of France

[73] Assignee: Therapeutiques Subtitutives Groupement D'Interet Public, Villetaneuse, France

[21] Appl. No.: 961,033

[22] Filed: Oct. 14, 1992

Related U.S. Application Data

[63] Continuation of Ser. No. 707,218, May 24, 1991, abandoned, which is a continuation of Ser. No. 388,028, Aug. 1, 1989, abandoned.

[30] Foreign Application Priority Data

Aug. 2, 1988 [FR] France .................. 88 10435

[51] Int. Cl.$^5$ .................. C12N 11/00; C07K 17/00
[52] U.S. Cl. .................. 424/499; 210/635; 210/656; 210/198.2; 210/502.1; 530/813; 530/814; 530/413; 435/177; 435/178; 435/179; 436/524; 436/529
[58] Field of Search .................. 430/529; 530/381, 816, 530/181; 435/179, 176; 525/54.21; 424/400

[56] References Cited

U.S. PATENT DOCUMENTS

| | | | |
|---|---|---|---|
| 3,645,939 | 2/1972 | Gaylord | 525/54.1 |
| 4,059,685 | 11/1977 | Johnson | 424/12 |
| 4,308,254 | 12/1981 | Tayot et al. | 424/124 |
| 4,335,017 | 6/1982 | Miles | 252/430 |
| 4,933,284 | 6/1990 | Lapins et al. | 435/179 |
| 4,933,285 | 6/1990 | Patton | 530/816 |
| 5,077,210 | 12/1991 | Eigler et al. | 435/176 |

FOREIGN PATENT DOCUMENTS 0130898  1/1985  European Pat. Off. ....... C08F 8/30

OTHER PUBLICATIONS

Patent Abstracts of Japan, vol. 11, No. 365, JP-A-62 136241.
(Nomura), Jun. 19, 1987; vol. 12, No. 40, JP-A-62 191042, (Nagano), Aug. 21, 1987.

*Primary Examiner*—Thurman K. Page
*Assistant Examiner*—Peter F. Kulkosky
*Attorney, Agent, or Firm*—Jacobson, Price, Holman & Stern

[57] ABSTRACT

This granular material consists of a granular porous support bearing negative or positive charges, coated on its surface with a first layer of impregnation with a hydrophilic polymer bearing charges opposite to those of the support, the quantity of said charges present on said polymer being substantially equal to that of the charges present at the surface of the support; and another layer, bound to the first by irreversible chemical coupling, of another hydrophilic polymer which is functional, namely bearing groups endowing said functional hydrophilic polymer with a specific but reversible affinity for at least one biological substance. Among the applications of this material, there are mentioned the separation and purification of antithrombin III and coagulation factors (factors II, VII, VIII, IX, X), and separation of activated coagulation factors (activated factor II, activated factor IX, activated factor X) in solutions containing said non-activated factors.

8 Claims, 2 Drawing Sheets

MATERIALS CAPABLE OF BINDING BIOLOGICAL SUBSTANCES, AND ITS APPLICATIONS, IN PARTICULAR, AS IN AN AFFINITY CHROMATOGRAPHY SUPPORT

This application is a continuation of application Ser. No. 07/707,218, filed May 24, 1991, which is a continuation of application Ser. No. 388,028, filed Aug. 1, 1989, both now abandoned.

The present invention was produced at the Laboratoire de Recherches sur les Macromolecules (Macromolecule Research Laboratory) of PARIS NORD University (PARIS XIII), the Laboratory being associated with the Centre National de La Recherche Scientifique (National Center for Scientific Research) UA 502.

The present invention relates to a material capable of binding biological substances (molecules and cells), as well as to its use as a high performance liquid affinity chromatography support, for purifying or separating the said biological substances as well as for the reversible immobilization of molecular substances.

One of the difficulties in using liquid chromatography for industrial purposes is the mechanical strength of the solid matrix. From this standpoint, silica, for example, is a good base support. However, its use in the native state is not possible, inasmuch as it bears negatively charged silanol groups giving rise to spurious interactions which interfere with affinity chromatography. In addition, silica is unstable at pH values above 8 or 9.

Moreover, to satisfy the requirements of the techniques of affinity separation of biological molecules, the support, apart from great mechanical strength, must on the one hand not possess irreversible adsorption sites, and must on the other hand possess irreversibly bound and chemically stable sites having strong specific affinity.

The present invention enables these results to be achieved.

BRIEF DESCRIPTION OF THE DRAWINGS

FIG. 1 is referred to on page 42. FIGS. 2, 3, are referred to on page 43. FIG. 4 is referred to on pages 45 and 46.

Figure 1:
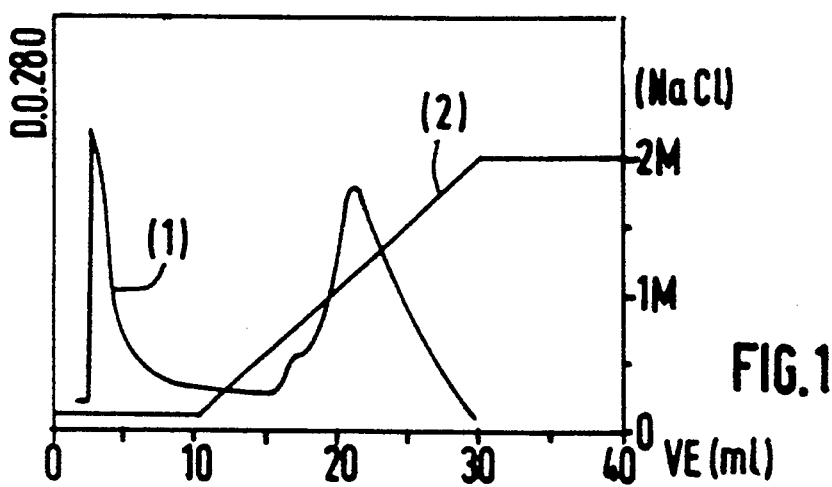
FIGS. 1-3 are elution curves and FIG. 4 is a chromatogram of aFGF on support material.

In contrast to what has been reported hitherto, according to the invention, a porous inorganic support is subjected to at least two successive impregnations: the first, in particular, with a weakly cationic dextran or polysaccharide modified by introduction onto the dextran or polysaccharide of a small proportion of cationic groups, such as a diethylaminoethyl (DEAE) group, these cationic charges having to balance almost exactly the anionic charges of the silanol groups of native silica, which constitutes a novel feature of the present invention; the second (or final) impregnation is accomplished by irreversible chemical coupling to the layer of DEAE-dextran, for example, of a soluble polymer functionalized so as to have a specific affinity for some particular biological substance, various proteins, nucleic acids, cells, and the like. The presence of an intermediate layer leads to improved results, in particular to assured elution of the biological substance, with a higher resolution.

The subject of the present invention is hence, in the first place, a granular material capable of binding biological substances, which material consists of a granular porous support bearing negative or positive charges, coated on its surface with successive layers, namely:

a first layer of impregnation with a hydrophilic polymer bearing charges opposite to those of the support, the quantity of said charges present on said polymer being substantially equal to that of the charges present at the surface of the support; and another layer, bound to the first by irreversible chemical coupling, of another hydrophilic polymer which is functional, namely bearing groups endowing said functional hydrophilic polymer with a specific but reversible affinity for at least one biological substance (biofunctional polymer).

The subject of the present invention is also a granular material capable of binding biological substances, which material consists of a granular porous support bearing negative or positive charges, coated on its surface with successive layers, namely:

a first layer of impregnation with a polysaccharide bearing charges opposite to those of the support, the quantity of said charges present on said polysaccharide being substantially equal to that of the charges present at the surface of the support; and at least one other layer, bound to the first by irreversible chemical coupling, of another hydrophilic polymer which is functional, namely bearing groups endowing said functional hydrophilic polymer with a specific but reversible affinity for at least one biological substance (biofunctional polymer).

According to another embodiment of the invention, at least one intermediate layer of a hydrophilic polymer is inserted and bound to the first layer (or to the preceding layer) by chemical coupling, before the binding of the layer of biofunctional polymer.

The material which forms the subject of the present invention is different from that described in U.S. Pat. No. 4,335,017. The latter relates to a composite material in which there has to be a minimum of deformable gel outside of the internal pore structure of the porous rigid support material, the composite material taking the form of discrete particles, permitting easier handling, column packing and column operation. This object is achieved by a particulate material which comprises discrete particles of porous rigid support and a deformable xerogel retained in and substantially filling the pore structure of the support particles, this deformable xerogel, which can be coupled with a biologically active substance, being capable of sorbing the chemical species from a solution.

The system employed hence does not involve a layer of impregnation with a hydrophilic polymer bearing charges opposite to those of the support, the quantity of said charges present on said polymer being substantially equal to that of the charges present at the surface of the support, which constitutes the first characteristic of the material according to the present invention. According to the latter, the intention is not to plug the pores of the particulate material as emerges from U.S. Pat. No. 4,335,017, but that the outer surface of the particulate material shall be covered as completely as possible with the first layer polymer so as to establish finally, after application of the other layers, the largest possible surface area of contact of the material when the latter is applied as an affinity chromatography support.

The granular porous support is advantageously an inorganic support, which may be chosen from silica, alumina, synthetic or natural derivatives of glasses, silicates and kaolin.

By way of example of an inorganic porous support, there may be mentioned a native silica bearing negatively charged silanol groups, the hydrophilic polymer or the polysaccharide constituting the first impregnation layer then bearing cationic groups capable of balancing the anionic charges of the native silica.

The native silica advantageously possesses a mean size of between 5 and 300 μm, a mean pore diameter of between 5 and 400 nm and a mean specific surface area of between 5 and 500 m²/g.

The cationic groups borne by the hydrophilic polymer or the polysaccharide constituting the first layer are, for example, diethylaminoethyl (DEAE) groups.

The hydrophilic polymer constituting the first layer, and the possible intermediate layers, can be crosslinked or otherwise. It is preferable, in general, that the polymer is crosslinked, thereby providing for good impregnation of the inorganic support.

The polysaccharide constituting the first layer, and the possible intermediate layers, is advantageously chosen from dextrans, agaroses and other water-soluble, natural or synthetic polysaccharides.

Such polysaccharides may be crosslinked, after impregnation, for example, by means of 1,4-butanediol diglycidyl ether (BDDE), epichlorohydrin or glutaraldehyde.

The biofunctional polymer is bound to the polymer constituting the preceding layer by means of a coupling agent, such as bis(epoxiranes), carbonyldiimidazole (CDI) or N-ethoxycarbonyl-2-ethoxy-1,2-dihydroquinoline (EEDQ), it being possible for such an agent to be used also for binding the intermediate layers to one another in the case where such layers are envisaged.

The water-soluble biofunctional polymer possesses an affinity with respect to biological substances, either by its very nature or as a result of chemical modifications. Thus, the groups endowing affinity with respect to biological substances can be of the carboxyl and/or sulfonate and/or amino acid type, and derivatives thereof, in variable proportions. The polysaccharide can, however, retain unsubstituted glucosyl units, such as the units (A) of the formula (I) given below, insofar as the desired affinity is sufficient.

The biofunctional polymer is crosslinked, after impregnation, for example by means of the same crosslinking agents as those stated above for the first layer and the possible intermediate layers.

The water-soluble biofunctional polymer is chosen from polysaccharides, such as heparins, modified heparins, fucans, dermatan sulfate, heparan sulfates and other natural or modified polysaccharides, vinyl polymers, such as polystyrene derivatives, polyacrylates or polydienes, polyurethanes and polymers bearing amino acids, bearing peptides, bearing ligands (for example lectin, agglutinin), bearing cell receptors and bearing colorants.

Thus, the water-soluble biofunctional polymer can be a dextran derivative corresponding to the general formula (I):

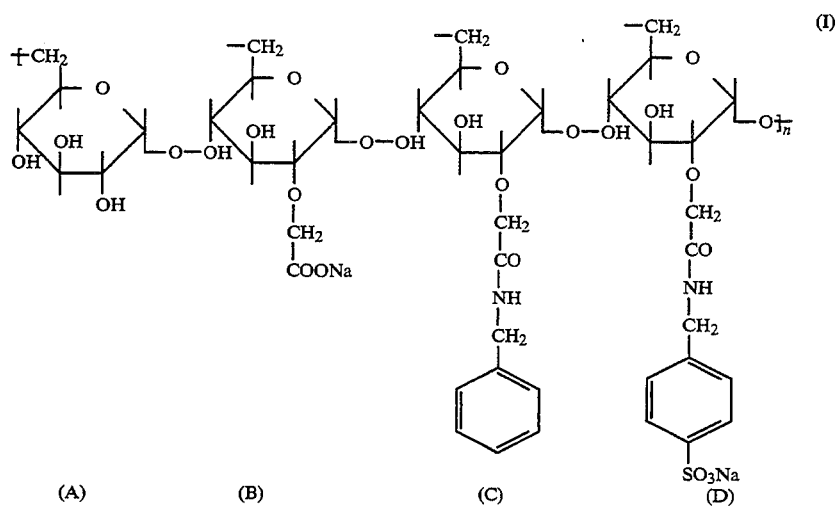

in which the proportion of the units (A), (B), (C) and (D) is variable.

The water-soluble biofunctional polymer can be a dextran derivative in which the units (C) and (D) shown in the above formula are replaced by units (E):

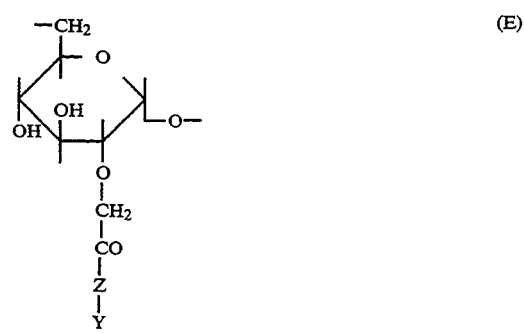

wherein:

Z denotes a single bond or a spacer chain such as —$(CH_2)_m$— with m=integer greater than or equal to 1;

and

Y denotes one or more amino acid residues or derivatives thereof.

The water-soluble biofunctional polymer can also be a dextran in which the chain is substituted with one or more identical or different groups belonging to the following categories:

—$Z_1$—$A_1$

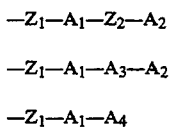

where:
- $Z_1$ denotes a spacer chain;
- $Z_2$ denotes a linking chain;
- $A_1$ denotes a phosphate residue;
- $A_2$ denotes the residue of a purine base or of a pyrimidine base;
- $A_3$ denotes a sugar residue; and
- $A_4$ denotes a residue of a molecule contributing to the polar structure of various phospholipids.

The spacer chain $Z_1$ is, in particular, chosen from the residues:
- $-(CH_2)_n-$, n equalling from 1 to 6, optionally made hydrophilic by replacement of at least one H by an OH; or
- $-SO_2-NH-(CH_2)_m-$, m equalling from 1 to 6, the residue $-(CH_2)_m-$ being optionally made hydrophilic by replacement of at least one H by an OH; and

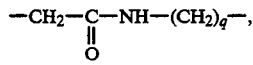

q equalling from 1 to 6, the residue $-(CH_2)_q-$ optionally being made hydrophilic by replacement of at least one H by an OH.

As regards the linking chain $Z_2$, this consists, in particular, of a chain $-(CH_2)_p-$, p equalling from 1 to 6, the residue $-(CH_2)_p-$ optionally being made hydrophilic by replacement of at least one H by an OH.

As regards the residue $A_2$, the residues of the major purine bases, namely adenine and guanine, as well as the residues of the major pyrimidine bases, namely cytosine, thymine and uracil, may be mentioned by way of examples.

The residue $A_3$ denotes, in particular, a sugar residue, joined via its $-CH_2-$ group to the phosphate residue; by way of example, there may be mentioned a pentose residue, in particular the D-ribose (or 2-deoxy-D-ribose) residue of formula:

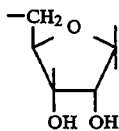

As regards the residue $A_4$, this denotes, in particular, an esterified molecule of choline, of ethanolamine, or serine, of glycerol or of inositol.

Other details relating to these phosphorylated dextrans will be found in European Patent Application No. 304,377, the contents of which are incorporated by reference in the present description.

The water-soluble biofunctional polymer can also be heparin; modified or otherwise, which is a natural glycosamino glycan present in the animal kingdom.

The water-soluble biofunctional polymers can also be fucans, natural products derived from marine algae.

The biofunctional polymer can also be dermatan sulfate or a haparan sulfate, water-soluble natural polysaccharides.

The water-soluble biofunctional polymer can be a vinyl polymer, for example a polystyrene derivative corresponding to the following general formula:

where:
W denotes one or more residues of molecules as are defined in French Patent Application No. 87/11813 of 21st Aug. 1987, or alternatively at least one $-SO_3^-$ or $-SO_2-R$ residue (R denoting the residue of an amino acid or of its derivatives).

The biological molecules are proteins, proteases, antibodies, antigens, enzymes and hormones.

The materials according to the invention possess great chemical stability over a wide range of pH (3 to 10 approximately) and temperature (up to 80° C.). They can be introduced dry into a column and washed with water, buffered solutions and then with aqueous sodium chloride solutions (up to 3M NaCl). They can also be introduced into a column by a wet method and percolation of the dispersion.

The capacity of these materials is high. It can reach 200 mg of ligand per gram of dry support.

The materials according to the present invention are prepared in the following manners:

A base support in the form of spheres or beads (silica) is impregnated with a concentrated solution of the first layer polymer (passivation of the silica); when impregnation has been achieved, crosslinking of this first layer, in a manner known per se, is usually performed and the material is dried, and the following layer or, successively, the following layers is/are then bound in the same manner.

According to a first embodiment, a second or final layer of polymer which is itself biologically active is used (this is the case, in particular, with the preparation described in Examples 1 and 2).

According to a second embodiment of the invention, a second or final layer of polymer which is in itself not biologically active is used, and functionalization is then performed (this is the case, in particular, with the preparation described in Example 4).

The present invention is also concerned with the application of the material as defined above to the purification or separation of biological substances, in which application a solution containing the biological substances which it is desired to purify or isolate is eluted on the said material, the layer of biofunctional polymer being such that the material selectively binds either the molecules which it is desired to purify or isolate, or the undesired impurities.

The following may thus be mentioned:
- the separation and purification of antithrombin III from a biological material containing this protein, such as blood, placenta, plasma fractions, serum;
- separation and purification of coagulation factors such as factors II, VII, VIII, IX, X, protein C and protein S, and of proteins such as cytochrome C, plasminogen, lysozyme and fibronectin, from a biological material containing these factors or proteins, such as blood, placenta, plasma fractions, serum;

the separation of activated coagulation factors such as activated factor II, activated factor IX, activated factor X, in solutions containing said non-activated factors;

the concentration of a very dilute protein solution in aqueous medium and removal of the water;

the purification and concentration of growth factors possessing an affinity for heparin or its homologs, from aqueous extracts, for example buffered solutions, containing said factors; and the separation and purification of the second heparin cofactor from a biological material containing it, such as blood, placenta, plasma fractions, serum.

In the case of the materials according to the invention for which the biofunctional polymer is a phosphorylated dextran, the specific adsorption of the different types of antibodies developed by lupus patients (anti-DNA antibodies, circulating anticoagulants and anti-phospholipids) may be mentioned in particular.

The present invention is also concerned with the use of the material as defined above for the reversible immobilization of molecular substances, such as antigens, antibodies and enzymes.

According to the invention, the substances to be purified or concentrated on the materials can also be cells.

The present invention possesses the following dual advantage:

on the one hand, the granular material of the invention has a mechanical strength enabling it to be employed in processes of high pressure chromatography (HPLC) or preparative chromatography which are well suited to industrial operations, as is well known to those versed in the art;

on the other hand, the invention possesses the advantage of being able to isolate, in the pure state, with a high resolution, a biological substance, such as antithrombin III or thrombin, whereas these compounds are retained irreversibly on the silica supports not modified according to the invention. It is found that a silica, even when treated by the binding of a layer of commercial DEAE-dextran and accordingly possessing an excess of positive charges, also leads to irreversible adsorption of proteins such as cytochrome C, plasminogen and lysozyme, for example.

The examples which follow are presented in order to illustrate the present invention further, no limitation to the scope of the latter being implied. They are concerned, on the one hand with the preparation of materials according to the invention, and on the other hand with the application of such materials by way of affinity chromatography supports.

In the interest of simplification and clarity, the materials according to the invention are designated by the substances which constitute the support (core) and the different successive layers, in their order of introduction.

EXAMPLE 1

Preparation of the Material Silica/Crosslinked DEAE-dextran/Heparin (Si/DEAE-Dext./Hep.)

1st stage

Preparation of Diethylaminoethyldextran (DEA-Dext.)

A solution of 40 g (1 mol) of NaOH in 80 ml of double-distilled water is stirred with 20 g (0.122 mol) of dextran (Pharmacia—France) of molar mass between 10,000 and 50,000, in 80 ml of water for 30 minutes at 4° C. 21 g (0.122 mol) of DEAE chloride hydrochloride are then added in several portions. The mixture is stirred at 4° C. for 10 minutes, and then heated to 60° C. for a period of 15 to 60 minutes. After the reaction, the mixture is cooled in an ice bath and its pH is adjusted to a value of 9.0 using concentrated HCl. The DEAE-dextran is precipitated with methanol and the suspension is filtered with gentle suction in a sintered funnel. Finally, the filter cake is washed with ethanol, which is drawn off through the filter. The partially dried product is ground to give a powder and the remaining alcohol is removed under vacuum at 40° C. The characteristics of the DEAE-dextran obtained have been determined by titration and by elemental analysis. The percentage of dextran units bearing DEAE groups has varied from 0.3 to 24% according to the dextran employed. More especially, dextrans bearing 3 to 10% approximately of DEAE groups have been selected.

2nd Stage

Preparation of Silica Beads Coated With DEAE-dextran (Si/DEAE-Dext.)

The coating of XO 015 or XO 075 silica beads (IBF) having the characteristics below:

| Silica | XO 015 | XO 075 |
| --- | --- | --- |
| Pore diam. | 125 nm | 30 nm |
| Specific surface area | 25 m$^2$/g | 100 m$^2$/g |
| Pore volume | 0.96 ml/g | 0.96 ml/g |
| Particle size | 40–100 μm | 40–100 μm | is carried out with a layer of DEAE-dextran, as prepared above.

10 g of the chosen silica are added gradually, during 2 hours, to 25 ml of an 8% strength weight/volume alkaline/aqueous solution (pH 11) of a DEAE-dext. derived from the first stage. After impregnation, the support is recovered and dried under vacuum at 80° C. The dry impregnated support is resuspended in 20 ml of diethyl ether at 40° C. with 60 mg of BDDE (crosslinking agent). The mixture is heated under reflux for 15 hours. The solid phase is collected and washed successively with 0.1M sodium hydroxide and 2M NaCl solution and, finally, with distilled water. The quantity of polysaccharide impregnating the support thus modified is determined by the carbon content (between 3 and 5% of carbon) obtained by elemental analysis.

3rd Stage

Preparation of the Material of the Title 2 g of silica beads coated with DEAE-dext., as prepared above, are added to 10 ml of dried dioxane; 0.5 g of CDI is added and the mixture is stirred for 2 hours. The solid product thus activated is recovered by filtration and washed with 30 ml of dry dioxane and then 50 ml of a 0.1M solution of sodium carbonate in water (pH 8.7) (coupling buffer).

The solid product is suspended in 10 ml of coupling buffer (pH 8.7), and 8 g of crude heparin (batch PHR 0881-Choay) are added. The mixture is stirred for 48 hours at room temperature. 10 ml of aqueous sodium chloride solution (4M) are then added and the mixture is stirred for 30 minutes.

The solid product is filtered off and washed successively with 50 ml of 2M NaCl solution, 50 ml of distilled water and 10 ml of 0.1M Tris-HCl buffer (pH 8.7) in order to deactivate the active groups not coupled, and the product is finally equilibrated in the elution buffer or in double-distilled water.

The bound heparin content is determined by measuring the activity of the filtrate, and is equal to 67% of the initial quantity of heparin used for the coupling (11.6 mg/g of dry support).

EXAMPLE 2

Preparation of the Material
Silica/DEAE-dextran/CMDBS-dextran
(Si/DEAE-dext./CMDBS-dext.)

The outer layer in this case consists of a dextran carboxymethyl-benzyl-sulfonate designated CMDBS-dext., of formula (Ia):

where the units (A), (B), (C) and (D) have the respective percentages of 30, 53, 3 and 17%, this compound being prepared according to the procedure described in French Patent No. 2,555,589.

Silica beads coated with DEAE-dext. are prepared as described in Example 1 (first and second stages).

2 g of these dried beads are then suspended in 15 ml of previously dried ethyl ether. 15 μl of BDDE are added.

The mixture is stirred at 40° C. for 40 minutes and the solvent is removed by evaporation. The solid product is dried under vacuum at 80° C. for 30 minutes. The activated product is washed with 20 ml of 0.1M NaOH and then with 50 ml of 2M NaCl. It is then suspended in 10 ml of aqueous sodium hydroxide solution (pH 11), and 400 mg of CMDBS-dext. are added.

The mixture is stirred at 40° C. for 40 minutes. The product is recovered by filtration, dried under vacuum and then washed with 50 ml of 2M NaCl solution, and is taken up with 10 ml of 0.1M Tris-HCl buffer (pH 8.7) in order to deactivate the active groups not coupled.

The bound CMDBS-dext. content, determined by micro-analysis, is 90% of the CMDBS-dext. added, corresponding to approximately 90 mg/g of dry support.

EXAMPLE 3

Preparation of the Material Silica/Crosslinked
DEAE-dextran/Phosphorylated Dextran
(Si/DEAE-dext./Pho-dext.)

First Stage
Preparation of Phosphorylated Dextran (Pho-dext.)
Procedure A 10 g of carboxymethyldextran, corresponding to the general formula already given in Example 2 but with only units A and B, are dissolved in 150 ml of benzene. 50 ml of thionyl chloride are added to the reaction medium, which is brought to 50° C. for 24 hours. The acid chloride is isolated and a condensation with ethanolamine is performed to yield the following formula:

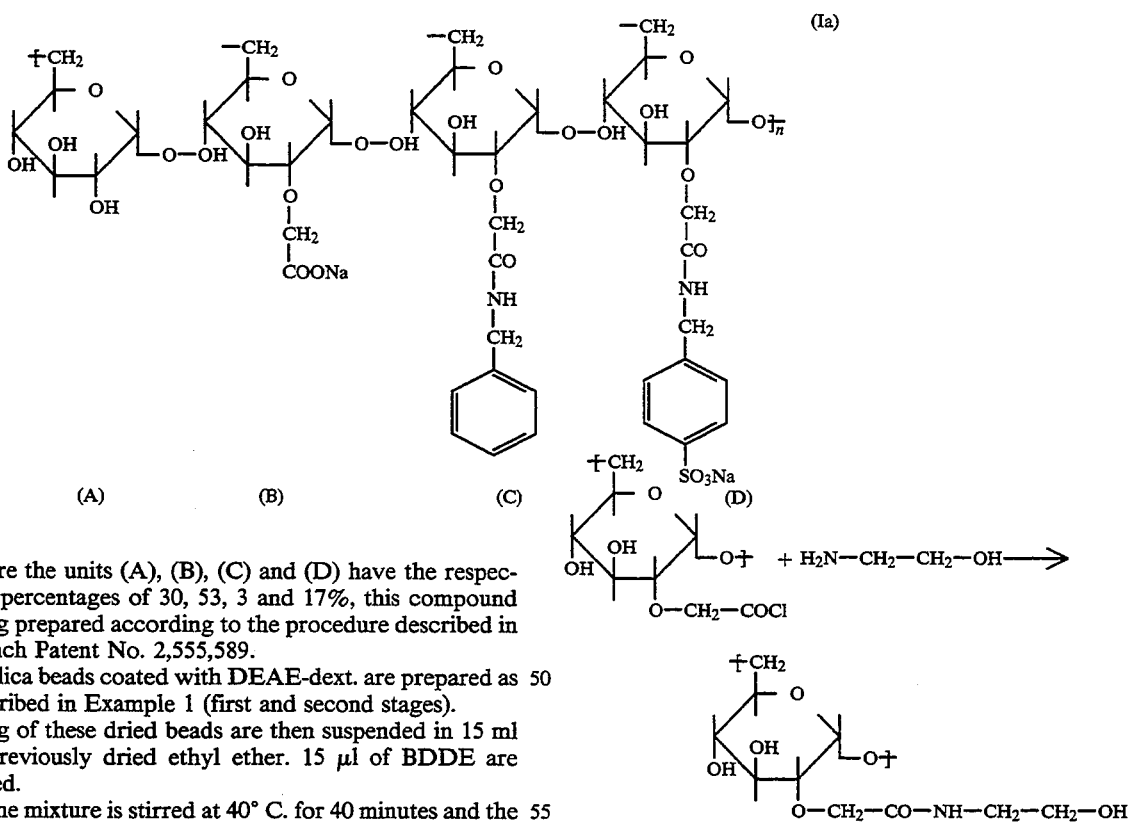

10 g of acid chloride, corresponding to approximately 40 meq of chlorine, are introduced into 150 ml of pyridine. An excess of ethanolamine (120 mmol) is then added at 35°–40° C. for one hour, and thereafter at 50° C. for 10 hours.

Procedure B 10 g of carboxymethyldextran are dissolved in 70 ml of water, the pH being adjusted to 3 with 1N HCl solution. A solution of 20 g of EEDQ in 160 ml of ethanol is then added. The mixture is stirred for 30 minutes, and 80 mmol of ethanolamine are added while the pH is maintained at 9.3. The reaction lasts for 20 hours. The solvent is evaporated off and the compound is precipitated in methanol and then dried under vacuum.

The dextran bearing ethanolamine groups according to experiment A or experiment B is then phosphorylated.

The chemical reaction is given below:

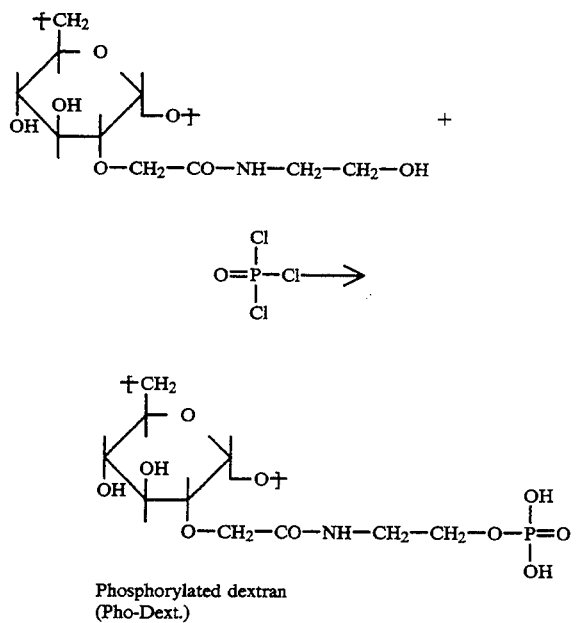

Phosphorylated dextran
(Pho-Dext.)

10 g of ethanolamine-dextran (38 meq) are introduced into 100 ml of trimethyl phosphate, $PO(OCH_3)_3$. 6.4 g of $POCl_3$ (43 meq) are then added, and the mixture is brought to 60° C. for at least 15 hours and then hydrolyzed in 20 to 30 ml of water. The reaction medium is evaporated to remove part of the water, and precipitation of the phosphorylated dextran is performed in acetone.

Ethanolamine may be replaced by other types of amines such as hexanolamine, in which case the spacer arm is different.

Second Stage

Preparation of the Compound of the Title

The procedure is similar to that of Example 2, using 2 g of Si/DEAE-dextran beads and 400 mg of Pho-dextran.

EXAMPLE 4

Preparation of the Material
Silica/DEAE-dextran/Crosslinked
Phenylalanine-sulfonate-dextran
(Si/DEAE-dext./PheSO$^-$3-dext.)

First Stage

Preparation of the Material Si/Crosslinked DEAE-dext./Crosslinked Dextran)

2 g of dry beads of Si/crosslinked DEAE-dextran, prepared according to the procedure described in Example 1, are suspended in 15 ml of dry ethyl ether with 15 µl of BDDE.

The mixture is stirred at 40° C. for 40 minutes and the solvent is removed by evaporation. The solid product is dried under vacuum at 80° C. The support thus activated is suspended in 25 ml of aqueous sodium hydroxide solution, pH 11, containing 6% of dextran T 500 (Pharmacia-France). The mixture is stirred for 40 minutes. The dry product is filtered off, dried under vacuum at 80° C. and then washed successively with 0.1M sodium hydroxide and 2M NaCl solutions and, finally, with double-distilled water. This material Si/crosslinked DEAE-dextran/crosslinked dextran contains approximately 5.4 g of C per 100 g of dry support.

Second Stage

Preparation of the Material of the Title 2 g of the material obtained in the first stage are suspended in 10 ml of dioxane. 0.5 mg of CDI is added. The mixture is stirred for 2 hours at room temperature. The product thus activated is recovered by filtation and washed successively with water and then with 0.1M $Na_2CO_3$ solution (pH 8.7).

The solid product is suspended in 10 ml of coupling buffer (0.1M $Na_2CO_3$, pH 8.7). 30 mg of L-phenylalanine are added. The mixture is stirred for 48 hours at room temperature. 40 mmol of sodium chloride are then added and the mixture is stirred for 30 minutes. The solid product is recovered by filtration and washed with water, 2M aqueous NaCl solution and 10 ml of 0.1M Tris-HCl buffer solution (pH 8.7) in order to deactivate the active groups not coupled, and it is then finally washed with water and dried.

The dry product, containing approximately 10 mg of coupled L-phenylalanine per g of dry support, is suspended in 50 ml of dry methylene chloride. 0.5 mmol of chlorosulfonic acid is added. The mixture is stirred gently at 40° C. for 4 hours. The solid is recovered by filtration and washed with 50 ml of methylene chloride and then with 50 ml of a water/dioxane mixture. The chlorosulfonyl groups substituting the aromatic ring are hydrolyzed by stirring the support in 50 ml of a water/dioxane (50% v/v) mixture at room temperature for 20 hours. The product is then washed with water and dried. Determination of the chlorosulfonyl groups by assay of chloride ions shows that the degree of chlorosulfonation is in the region of 80%. The biofunctional product is represented by the following formula:

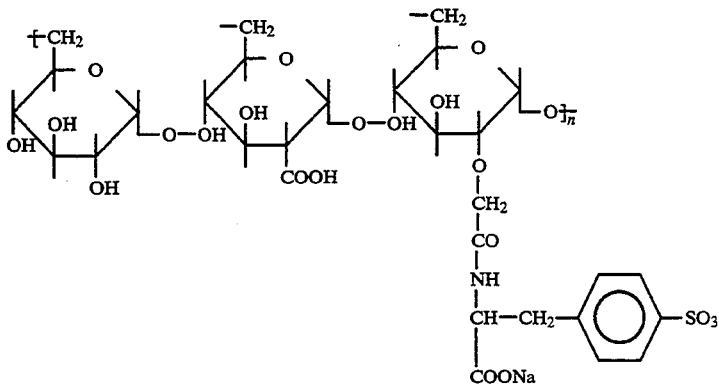

EXAMPLE 5

Preparation of the Material Silica/Crosslinked DEAE-dextran/ADM-dextran (Si/DEAE-dext./ADM-dext.)

The procedure is as in Example 4, except that, in the first stage, CMDBS-dextran as defined in Example 2 is used in place of dextran T500 and drying is performed, no longer at 80° C. but at 60° C. and that, in the second stage, L-phenylalanine is replaced by arginine methyl ester (ADM) and the final sulfonation is not performed.

The dry product obtained contains approximately 10 mg of coupled arginine methyl ester per g of dry support. The second layer biofunctional polymer is a crosslinked dextran bearing biologically activated sulfonate and arginine methyl ester groups, and is represented by the following formula:

ml of aqueous NaCl solution (5.5M) and then 11.5 g of DEAE chloride hydrochloride are added to the medium. After 15 min, the product is precipitated by adding a methanol/HCl (2% by volume) solution, filtered off and dried under vacuum at 40° C. for 15 hours. The degree of substitution is determined by acid/base titration and by elemental analysis; it is in the region of 10 meq of DEAE groups per gram of dry product.

Second Stage

Preparation of the Material Silica/Crosslinked DEAE-agarose

XO 075 and XO 015 silicas, as defined above, are coated with the DEAE-agarose prepared in the first stage.

10 g of silica are added gradually to 25 ml of alkaline aqueous solution (pH 11) of DEAE-agarose (8% by weight).

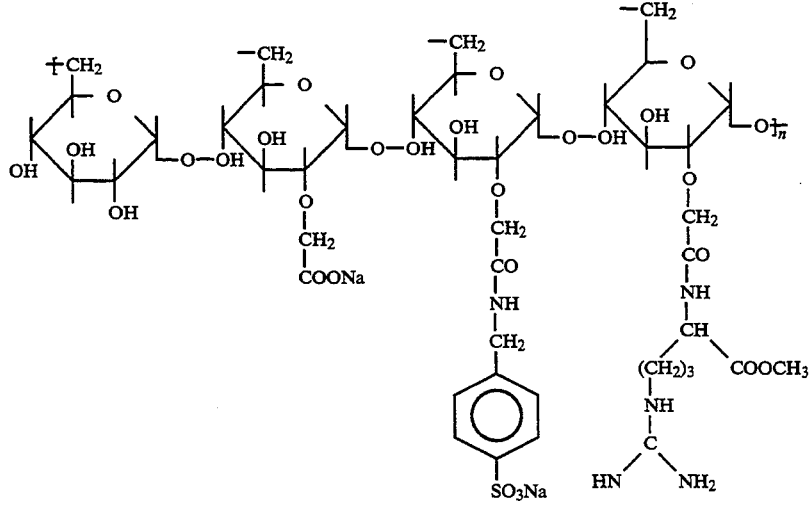

EXAMPLE 6

Preparation of the Material Silica/Crosslinked DEAE-agarose/Fucan

First Stage

Modification of an Agarose with DEAE Groups

Agaroses marketed by Société IBF under the names Indubioses A 37 HAA and A 37 NA are used. These agaroses are modified by the introduction of DEAE groups in the following manner:

9.2 g of agarose are dissolved in 210 ml of distilled water and the mixture is heated to 60° C. for 2 hours.

The reaction medium is stirred gently for 2 hours and, after impregnation, the support is recovered by filtration and dried under vacuum at 80° C. 10 g of silica thus impregnated are suspended in 20 ml of diethyl ether at 40° C. with 60 mg of BDDE (crosslinking agent) for 30 min. The reaction medium is heated to 80° C. for 15 hours. The solid phase is collected and washed successively with 0.1M sodium hydroxide, 2M NaCl solution and, finally, distilled water. The quantity of polysaccharide coating the silica is determined by the carbon content, obtained by elemental analysis (between 3 and 4% of C/g of dry support).

Third Stage

Preparation of the Material of the Title

The material obtained in the second stage is activated and then coupled with fucans according to the following procedure:

2 g of said material are added to 10 ml of dry dioxane with 0.5 g of CDI. The mixture is stirred for 2 hours. The solid product is filtered off and washed with 25 ml of dry dioxane and then with 50 ml of 0.1M aqueous sodium carbonate solution (pH 8.7). The product is then suspended in 10 ml of this same carbonate buffer (pH 8.7), and 100 mg of fucan (Sigma) are added. The mixture is stirred for 48 hours at room temperature. 200 mg of sodium chloride are then added. After 30 minutes, the solid product is recovered by filtration and washed successively with 50 ml of 2M aqueous NaCl solution, 50 ml of distilled water and 10 ml of 0.1M Tris-HCl buffer solution (pH 8.7) in order to deactivate the activated groups not coupled and, finally, with 50 ml of distilled water. The bound fucan content, determined by assay of free fucans in the filtrate, is in the region of 80% of the initial quantity of fucan (43 mg of fucan per gram of dry support).

EXAMPLE 7

Preparation of the Material Silica/Crosslinked DEAE-dextran/Dermatan Sulfate 4 g of silica coated with a DEAE-dextran, prepared according to the procedure described in Example 1, are suspended in 30 ml of dry ethyl ether with 10 μl of BDDE. The mixture is stirred at 40° C. for 40 minutes. The solvent is removed by gentle evaporation. The support thus activated is suspended in 30 ml of an alkaline aqueous solution (pH 10.5) containing 500 mg of dermatan sulfate, and stirred for 1 hour. The solid product is recovered by filtration, dried under vacuum and then washed successively with 50 ml of 0.1M sodium hydroxide solution and 50 ml of 2M NaCl and several times with 50 ml of double-distilled water. The quantity of bound dermatan sulfate is determined by elemental analysis; it corresponds to 65.1 mg of dermatan sulfate per gram of dry support.

APPLICATION EXAMPLE 1

Purification of Antithrombin III from Human or Animal Serum or Plasma

Materials such as those of Examples 1 and 2 were used, the silica support containing from 10 to 100 mg of heparin per gram of dry gel (in the case of materials of the type obtained in Example 1) and from 60 to 200 mg of modified dextran per gram of dry gel (in the case of materials of the type obtained in Example 2). With a column of volume 2 ml, it is possible to retain antithrombin III on the column in 0.1M NaCl solution, and to elute the substance at a higher NaCl concentration. This concentration is 1.5M NaCl with a support based on heparin and 1.8M NaCl with a support based on CMDBS-dext.

FIG. 1 of the attached drawing shows an elution curve in a typical experiment.

Legend to FIG. 1: Elution of Antithrombin III on Silica/DEAE-dext./Heparin

Eluent: 0.02M Tris-HCl, pH 7.4
Column: 0.7×5 cm
Flow rate: 1 ml/minute
Abscissae: Elution volume (EV) in ml
Ordinates: Optical density OD at 280 nm (curve 1)
Molar concentration of NaCl in the eluent (curve 2)

APPLICATION EXAMPLE 2

Purification of Thrombin

Figure 2:
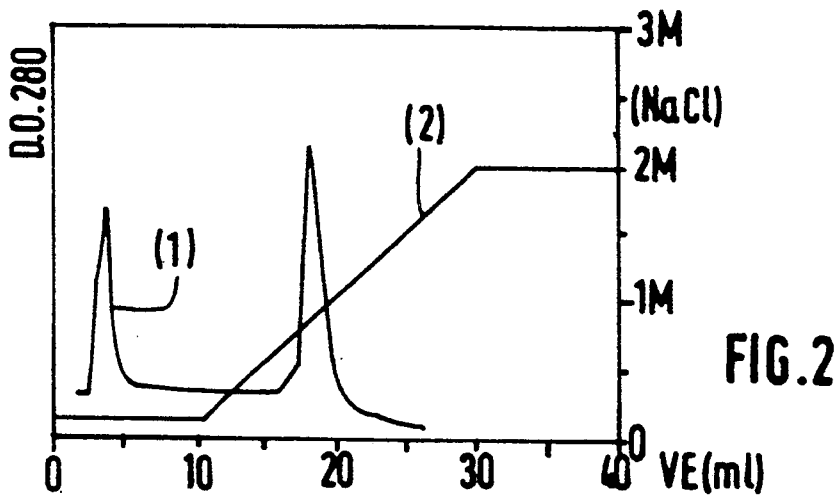

FIG. 2 of the attached drawing shows an elution curve in one experiment.

Legend to FIG. 2: Elution of thrombin on silica/DEAE-dext./heparin: identical to that for FIG. 1

APPLICATION EXAMPLE 3

Elution of Platelet-poor Human Plasma

Figure 3:
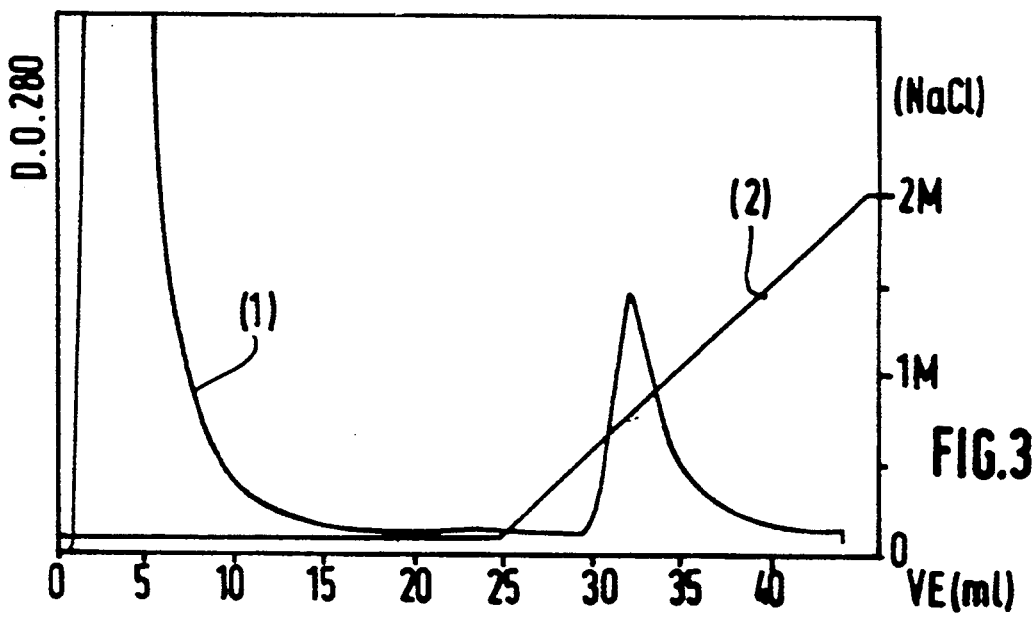

FIG. 3 of the attached drawing shows an elution curve in a typical experiment.

The peak observed, eluted at an ionic strength of approximately 0.8M NaCl, is that of antithrombin III.

Legend to FIG. 3: Identical to that for FIGS. 1 and 2.

APPLICATION EXAMPLE 4

Purification of Growth Factor of the Acidic Fibroblast Growth Factor (aFGF) Type from a Crude Extract of Ox Brain With a column containing 1.6 ml of gel consisting of the same type of support as above, 15 ml of the crude extract in 0.1M NaCl solution are passed through this gel at room temperature. A salt concentration gradient is then applied to the column and the growth factor, possessing a biological activity with respect to transformed cells labeled with tritiated thymidine, is eluted by increasing the salt concentration: this concentration is, in fact, 1.2M NaCl with the silica support based on heparin, and 1.3M NaCl with the support based on CMDBS-dext.

APPLICATION EXAMPLE 5

Separation of the Acidic and Basic Growth Factors Derived from Ox Brain 25 ml of ox brain extract are injected into a chromatographic system comprising an HPLC column (0.7×3 cm) packed with the material of Example 1. The initial elution buffer is a 0.01M Tris-HCl, 0.5M NaCl solution (pH 7.0). After injection, the column is eluted for a protracted period with the initial buffer (350 minutes) at a flow rate of 1 ml/minute in order to remove all undesirable proteins and thereby obtain very pure factors. The ionic strength of the eluent is then gradually increased by means of a gradient of composition up to 2M NaCl. A first elution peak containing the growth factors is thereby collected. The support is finally eluted for 10 minutes with a 0.01M Tris-HCl, 2M NaCl buffer solution, followed by 3M NaCl, in order to elute all the proteins bound to the support. A final stage enables the support to be re-equilibrated in the initial buffer.

Figure 4:
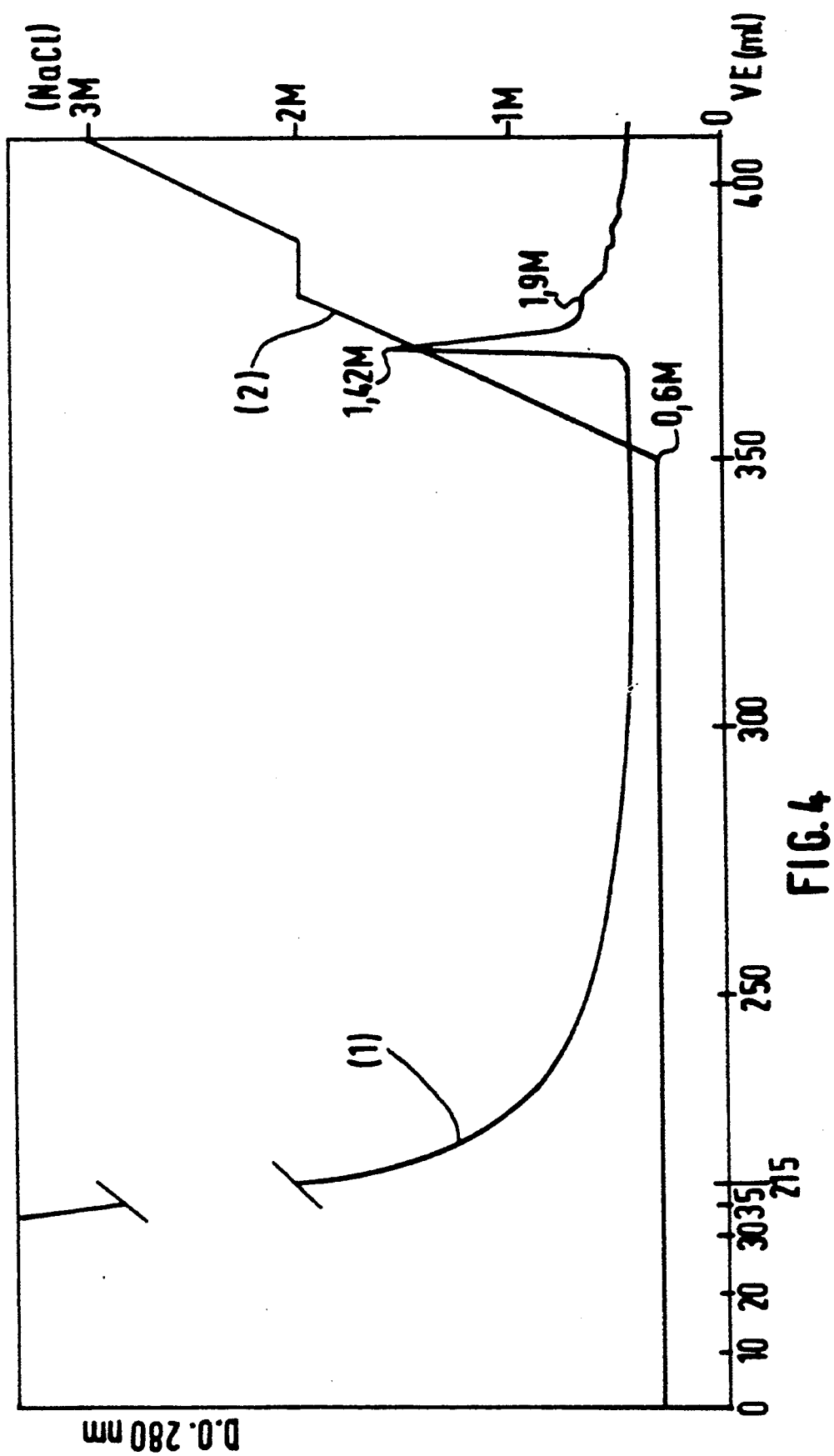

FIG. 4 of the attached drawing shows the chromatogram of aFGF on the support material of Example 1.

Legend to FIG. 4
Column: 0.7×0.3 cm
Flow rate: 1 ml/minute
Sample: 25 ml of extract
Buffer A: 0.01M Tris-HCl, 0.5M NaCl pH 7.0
Buffer B: 0.01M Tris-HCl, 3.0M NaCl pH 7.0
Abscissae and ordinates: as in FIGS. 1 to 3

Study by polyacrylamide gel electrophoresis shows that the fractions collected during the gradient contain the growth factors. The degree of enrichment of these proteins, present in small amounts in the ox brain extract, is large, and the purification is obtained without apparent degradation of the growth factors, which retain their biological activity (determined by the tritiated thymidine method).

APPLICATION EXAMPLE 6

Separation of the Second Heparin Cofactor (HC II)

An HPLC column (12.5×0.4 cm), packed with 2 g of the material prepared according to the procedure described in Example 6, is eluted with a 0.05M phosphate buffer solution (pH 7.4). 5 ml of normal human plasma are injected. The major peak obtained (4.5 ml) after the injection is collected. It contains 0.98 U of antithrombin III (AT III)/ml and 0.19 U of HC II/ml, as well as numerous other plasma proteins (albumin, transferrin, and the like). After the detector signal has returned to the base line, the ionic strength of the eluent is increased by percolating a solution of the same buffer (pH 7.4) containing 0.5M NaCl. Proteins bound to the support are then detached and the elution peak is collected (9.8 ml). Assay of the anticoagulant activity of this latter fraction shows that it contains chiefly HC II (4.8 units) and a very small proportion of AT III (approximately 0.1 unit). The HC II thereby obtained corresponds to 95% of the initial quantity of HC II present in the 5 ml of plasma. The specific activity of the protein thus purified is 4.15 U/mg, which corresponds to a very substantial enrichment of this protein in a single purification stage.

APPLICATION EXAMPLE 7

Purification of Activated Factor II from a Human Plasma or from a Fraction Derived from Human Plasma The support possesses abiofunctional layer consisting of a dextran as defined in Example 5 or alternatively a polymer as described in French Patent No. 2,548,193. The silica support contains from 10 to 100 mg of biofunctional polymer per gram of dry gel. With a column of volume 2 ml, it is possible to isolate thrombin from a mixture of 5 ml consisting of factor II completely activated to factor IIa, and factors VII, IX and X.

The mixture of proteins is deposited on the column. After washes in initial buffer solution (0.05M Tris-HCl, 0.1M NaCl, pH 7.4), a linear gradient of ionic strength from 0.1M to 2.5M NaCl is applied to the column. The fraction eluted at concentration 0.8M NaCl contains 70% of the biological activity of the thrombin deposited.

The thrombin thus isolated has a specific activity of 3000 NIH (National Institute for Health) u per mg of dry protein. The method hence makes it possible, either to remove traces of factor IIa present in a solution consisting of factors II, VII, IX and X (for the treatment of hemophilia B patients), or to purify thrombin.

APPLICATION EXAMPLE 8

In a manner similar to that of Example 7, it is possible to accomplish the separation of activated factor X from a human plasma, from a fraction derived from human plasma or from a solution of factor X containing traces of factor Xa.

The support used accordingly possesses a layer of biofunctional polymer consisting:
either of heparin or polysaccharides,
or of dextrans modified with carboxyl and sulfonate or sulfonate and amino acid (amino acid sulfonamide or amide of the $-SO_2-NH-CHR-COOH$ or $-CH_2-CO-NH-CHR-COOH$ type) groups, with R=side chain of an amino acid.

What is claimed is:

1. A granular material, capable of binding a biological substance and having as successive layers:
   a) a granular porous Silica support having a surface and bearing charges,
   b) a first hydrophilic polymer layer of agarose or dextran coated on the support surface, the hydrophilic polymer bearing charges opposite to those of the support, the quantity of said charges present on said polymer being substantially equal to that of the charges present at the surface of the support;
   c) another layer, covalently bound to the first layer, of another and biofunctional hydrophilic polymer which bears groups endowing said biofunctional hydrophilic polymer with a specific but reversible affinity for at least one biological substance; the biofunctional hydrophilic polymer being a member selected from the group consisting of heparin, modified heparin, dextran, a dextran derivative, a fucan, dermatan sulphate and heparin sulphate; and optionally, at least one intermediate hydrophilic bound to the first layer or to a preceding layer by chemical coupling.

2. A granular material as claimed in claim 1 which is silica/crosslinked DEAE-dextran/heparin.

3. A granular material as claimed in claim 1 which is silica/DEAE-dextran/CMDBS-dextran.

4. A granular material as claimed in claim 1 which is silica/crosslinked DEAE-dextran/phosphorylated dextran.

5. A granular material as claimed in claim 1 which is silica/DEAE-dextran/crosslinked phenylalanine-sulfate-dextran.

6. A granular material as claimed in claim 1 which is silica/crosslinked DEAE-dextran/ADM-dextran.

7. A granular material as claimed in claim 1 which is silica/crosslinked DEAE-agarose/fucan.

8. A granular material as claimed in claim 1 which is silica/crosslinked DEAE-dextran/dermatan sulfate.

* * * * *